United States Patent
Numata

[19]

[11] Patent Number: 5,831,953
[45] Date of Patent: Nov. 3, 1998

[54] OPTICAL DISK DEVICE USING AN OPTICAL PICKUP AS A READ MECHANISM FOR DETECTING A THICKNESS OF THE SUBSTRATE OF AN OPTICAL DISK

[75] Inventor: Tomiyuki Numata, Tenri, Japan

[73] Assignee: Sharp Kabushiki Kaisha, Osaka, Japan

[21] Appl. No.: 754,534

[22] Filed: Nov. 21, 1996

[30] Foreign Application Priority Data

Nov. 24, 1995 [JP] Japan .................................... 7-306239

[51] Int. Cl.$^6$ ...................................................... G11B 7/00
[52] U.S. Cl. .................................................. 369/58; 369/54
[58] Field of Search ................................. 369/58, 54, 94, 369/44.25, 44.29, 44.35, 44.36

[56] References Cited

U.S. PATENT DOCUMENTS

| | | |
|---|---|---|
| 4,475,182 | 10/1984 | Hosaka . |
| 5,090,003 | 2/1992 | Watanabe et al. . |
| 5,263,011 | 11/1993 | Maeda et al. ............................. 369/94 |
| 5,418,766 | 5/1995 | Fujisawa et al. ......................... 369/54 |
| 5,665,957 | 9/1997 | Lee et al. ................................ 369/118 |
| 5,671,203 | 9/1997 | Ra .............................................. 367/58 |

FOREIGN PATENT DOCUMENTS

| | | |
|---|---|---|
| 658887 | 6/1995 | European Pat. Off. . |
| 4-162217 | 6/1992 | Japan . |
| 5-54396 | 3/1993 | Japan . |
| 5-101398 | 4/1993 | Japan . |
| 7-65409 | 3/1995 | Japan . |

Primary Examiner—Thang V. Tran

[57] ABSTRACT

An optical disk device of a simple structure using an optical pickup alone as read mechanism for detecting a thickness of the substrate of an optical disk. The optical disk device (1) carries out the focus search by moving the focal point of a laser beam emitted through an objective lens in a direction along the thickness of the optical disk in a region covering both the substrate surface and the recording layer, (2) converts S-shaped wave forms produced in a focus error signal FES from a two-piece photo-diode when the focal point passes through the substrate surface and recording layer, respectively into a digital signal $CP_{out}$, and (3) detects a pulse interval of the digital signal $CP_{out}$, by means of an MPU. Since the MPU detects the number of pulses of the digital signal $CP_{out}$, the optical disk device can also detect the number of the recording layers.

9 Claims, 9 Drawing Sheets

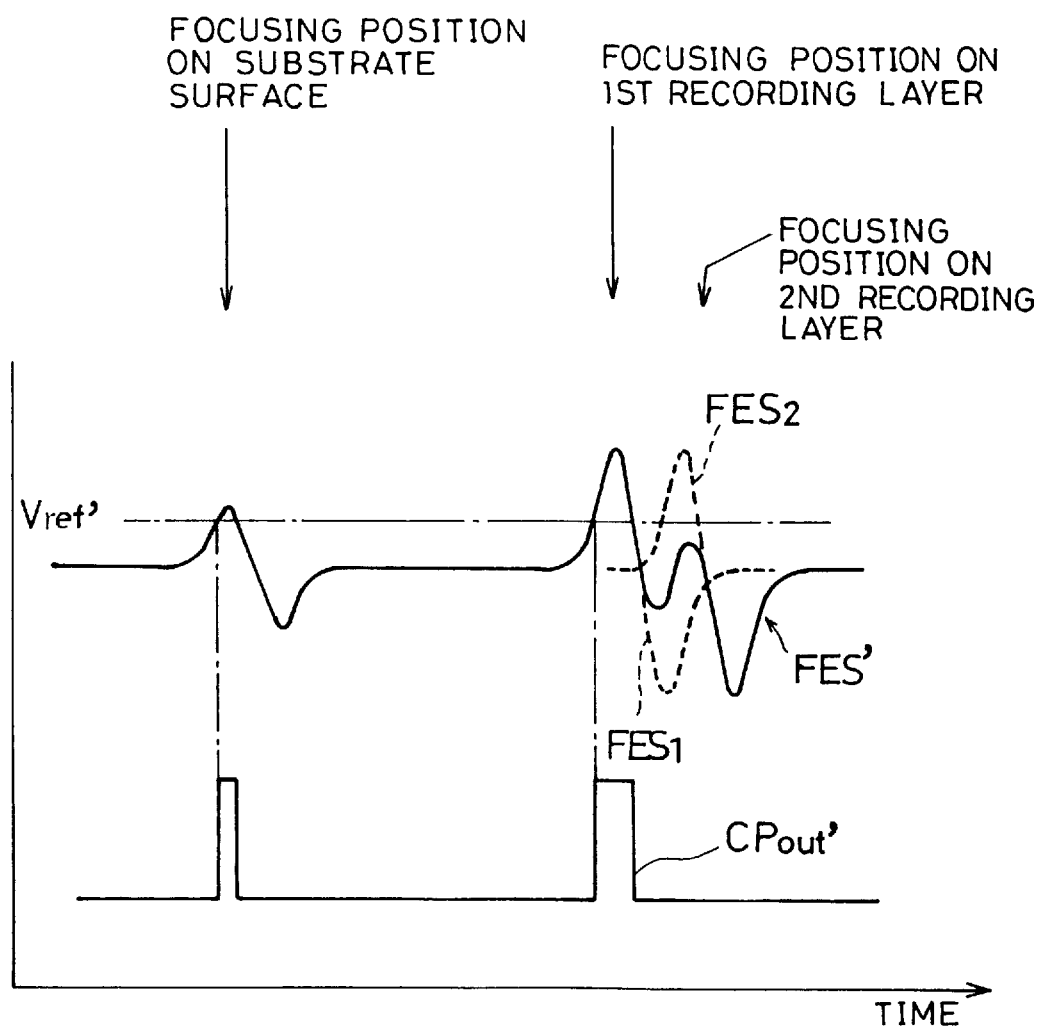

OPTICAL DISK DEVICE USING AN OPTICAL PICKUP AS A READ MECHANISM FOR DETECTING A THICKNESS OF THE SUBSTRATE OF AN OPTICAL DISK

FIELD OF THE INVENTION

The present invention relates to an optical disk device for recording/reproducing information into/from optical disks having different thicknesses and different numbers of recording layers.

BACKGROUND OF THE INVENTION

Optical disks have been used as information recording media of a large capacity. The most popular commercialized optical disk comprises a 1.2-mm thick substrate and a single-recording-layer placed on the surface of the substrate. An optical disk device for reproducing recorded information from the optical disk comprises a semi-conductor laser for emitting a laser beam, and an optical pickup having an objective lens for converging the laser beam onto the recording layer of the optical disk. Information is reproduced by converging the laser beam emitted from the semi-conductor laser onto the recording layer through the objective lens, and reading the light reflected from the recording layer.

Reducing the track pitch can effectively increase a capacity of the optical disk, but to reproduce information from an optical disk with such a reduced track pitch, the laser spot must be reduced as well by reducing the wave length of the semi-conductor laser serving as a light source of the optical disk device or increasing the numerical aperture of the objective lens. However, it is by no means easy to increase the numerical aperture, because the aberration produced by tilt of the optical disk increases in a direct proportion to the cube of the numerical aperture.

To solve the above problem, an optical disk having a 0.6 mm-thick substrate has been proposed. Reducing the thickness of the substrate permits the optical disk to have larger tilting allowance, thereby making it possible to increase the numerical aperture.

Alternatively, an optical disk having more than one recording layer has been proposed to increase a capacity of the optical disk. Here, information is reproduced from more than one recording layer under the focus control, that is, by irradiating a laser spot onto the optical disk having more than one recording layer and shifting the focal point from one recording layer to another. An optical disk having two recording layers (double-recording-layer) has been proposed as a particularly preferable example.

Thus, the typical optical disks have a substrate of either 1.2 mm or 0.6 mm thick, and either a single-recording-layer or double-recording-layer.

Under these conditions, it is important to make the optical disk device compatible, so that a single optical disk device can reproduce information from optical disks having substrates of different thicknesses and different numbers of recording layers. Accordingly, various techniques to fabricate a compatible optical disk device have been disclosed.

For example, Japanese Laid-Open Patent Application No. 65409/1995 (Tokukaihei 7-65409) discloses a technique for correcting aberration produced by a difference in thickness of the substrates, and Japanese Laid-Open Patent Application No. 54396/1993 (Tokukaihei 5-54396) discloses a technique for carrying out the focus servo on a target recording layer.

According to the aberration correcting technique in Japanese Laid-Open Patent Application No. 65409/1995 (Tokukaihei 7-65409), the thickness of the substrate of an inserted optical disk is judged first. When the optical disk is thick, a convex lens is placed between an objective lens designed for the 0.6 mm-thick substrate and the semi-conductor laser, whereas when the optical disk is thin, a concave lens is placed between the above objective lens and semi-conductor laser. Consequently, information is reproduced from an optical disk without causing spherical aberration regardless of the thickness of its substrate.

In the above aberration correcting technique, whether the inserted optical disk has a substrate of 1.2 mm or 0.6m thick is judged in the first place by, for example, the aberration correcting technique disclosed in Japanese Laid-Open Patent Application No. 65409/1995 (Tokukaihei 7-65409). Here, information in the form of a bar code or punch holes identifying its type is appended to the cartridge where the optical disk is kept, and the optical disk is identified by reading the appended information.

Also, Japanese Laid-Open Patent Application No. 162217/1992 (Tokukaihei 4-162217) discloses a relevant technique, in which the optical disk stores information to identify its type at a specific portion in the information region, and the identification information is read by the optical pickup.

In addition, a technique for checking the number of the recording layers is disclosed in Japanese Laid-Open Patent Application No. 54396/1993 (Tokukaihei 5-54396). According to this technique, the objective lens is moved in a direction along the thickness of the optical disk. Since a focus error signal varies when the laser beam emitted from the semi-conductor laser is converged onto the substrate and recording layer of the optical disk, respectively, such variance is detected and counted as pulses to check whether the recording layer is single or double.

However, in case of an optical disk which does not use the cartridge, the above technique of appending the identification information to the cartridge can not be adopted. Moreover, to read the identification information appended to the cartridge, the optical disk device must include read mechanism, such as a reflection sensor, besides the optical pickup. Further, a step of appending identification information to the cartridge is added in the fabrication process.

The relevant technique of recording the identification information into the specific information region is not practical because the thickness of the substrate can not be checked until the recorded information is reproduced from the optical disk. To be more specific, the type (for example, thickness of the substrate) of the optical disk must be identified to correct the aberration produced by the difference in thickness of the substrates before the recorded information is reproduced from the optical disk. However, as previously mentioned, the type is identified after the recorded information is reproduced.

Also, the technique checking the number of the recording layers by counting the number of the pulses of the focus error signal is effective only when the space between the recording layers is sufficiently large with respect to the dynamic range of the focus error signal. As shown in FIG. 9, when the space between the recording layers is tens of microns at most, a focus error signal $FES_1$ produced by the first recording layer alone and a focus error signal $FES_2$ produced by the second recording layer alone interferes with each other to produce a focus error signal FES' indicated by a solid line.

Thus, comparing a threshold voltage $V_{ref}'$ with the above focus error signal FES' does not enable a comparator to output a digital signal $CP_{out}'$ corresponding to a pulse signal that represents a precise number of the recording layers. If the threshold voltage $V_{ref}'$ is reduced to detect the variance in the focus error signal FES' derived from the second recording layer, false detection caused by noise occurs, thereby making it impossible to detect the number of the recording layers in a reliable manner.

SUMMARY OF THE INVENTION

It is therefore a first object of the present invention to provide an optical disk device which can judge the thickness of the substrate of an optical disk in a reliable manner.

To fulfill the first object, a first optical disk device of the present invention is furnished with:

a light converging section for converging a laser beam onto an optical disk having a substrate and a recording layer;

a moving section for moving the light converging section in a direction along a thickness of the optical disk;

a detecting section for detecting a focus error signal based on reflected light which is incident on the detecting section from the optical disk through the light converging section, and for detecting variance produced in the focus error signal when the laser beam is converged on the substrate and the recording layer, respectively while the light converging section is moved; and a judging section for judging a thickness of the substrate based on the variance in the focus error signal.

According to the above arrangement, the light converging section is moved by the moving section in such a manner that the focal point of the laser beam is moved in the direction along the thickness of the optical disk to bring the focal point onto the recording layer. It is preferable to arrange the optical disk device in such a manner that the focal point moves in a region covering both the recording layer and the surface of the substrate.

When the focal point of the laser beam is moved, the signal wave form obtained by the optical pickup varies when the focal point passes through the surface of the substrate and the recording layer, respectively. The detecting section detects an interval between the above variance. Since the interval varies depending on the thickness of the substrate, the judging section can judge the thickness of the substrate based on the interval thus detected.

Therefore, unlike the conventional optical disk device, the optical disk device of the present invention can judge the thickness of the substrate in a reliable manner using the optical pickup alone and omitting other read mechanism, such as a reflecting sensor, and without appending information including data as to the thickness of the substrate or the like to the optical disk or its cartridge. In addition, the optical disk device of the present invention can judge the thickness of the substrate before reproducing recorded information from the optical disk.

Consequently, the optical disk device of the present invention corrects aberrations produced by a difference in thickness of the substrates based on the above judging result, thereby making it possible to reproduce information from optical disks having the substrates of different thicknesses.

It is a second object of the present invention to provide an optical disk device which can detect the number of the recording layers of an optical disk using a signal generated by a photo-detector for detecting a quantity of light emitted from a semi-conductor laser.

To fulfill the second object, a second optical disk device of the present invention is furnished with:

a light converging section for converging a laser beam onto an optical disk having a substrate and at least one recording layer;

a moving section for moving the light converging section in a direction along a thickness of the optical disk;

a detecting section for detecting a laser power detecting signal that varies in response to power of the laser beam, and for detecting variance in the laser power detecting signal produced when the laser beam is converged onto the substrate and each recording layer, respectively while the light converging section is moved;

a judging section for judging that the number of the recording layers is (n−1) when n>2, where n is the number of times the variance has been detected in the laser power detecting signal, and that no optical disk is inserted when n=0.

According to the above arrangement, the light converging section is moved by the moving section in such a manner that the focal point of the laser beam is moved in the direction along the thickness of the optical disk to bring the focal point onto the recording layer. It is preferable to arrange the optical disk device in such a manner that the focal point moves in a region covering both the substrate surface and the recording layer(s).

When the focal point of the laser beam reaches the recording layer, the level of the output signal from the photo-detector rises because of light returned to the semi-conductor laser. The detecting section detects an increase in signal wave form in response to the rise in level. Because the wave form increases abruptly, variances in the wave forms of the signal do not interfere with each other even when the space between the recording layers is small. Also, since the number of the increases in wave forms varies depending on the number of the recording layers, the judging section can judge the number of the recording layers in a reliable manner.

Consequently, the optical disk device of the present invention can reproduce information from optical disks having different numbers of the recording layers by starting the focus servo on a target recording layer or switching the circuit gain depending on the number of the recording layers based on the above judging result.

For a fuller understanding of the nature and advantages of the invention, reference should be made to the ensuing detailed description taken in conjunction with the accompanying drawings.

BRIEF DESCRIPTION OF THE DRAWINGS

FIG. 9 is a view illustrating wave forms of a focus error signal and an output signal from a comparator when an optical disk having a double-recording-layer is inserted into a conventional optical disk device.

DESCRIPTION OF THE EMBODIMENTS

(EMBODIMENT 1)

The following description will describe Embodiment 1 of the present invention.

Figure 1:
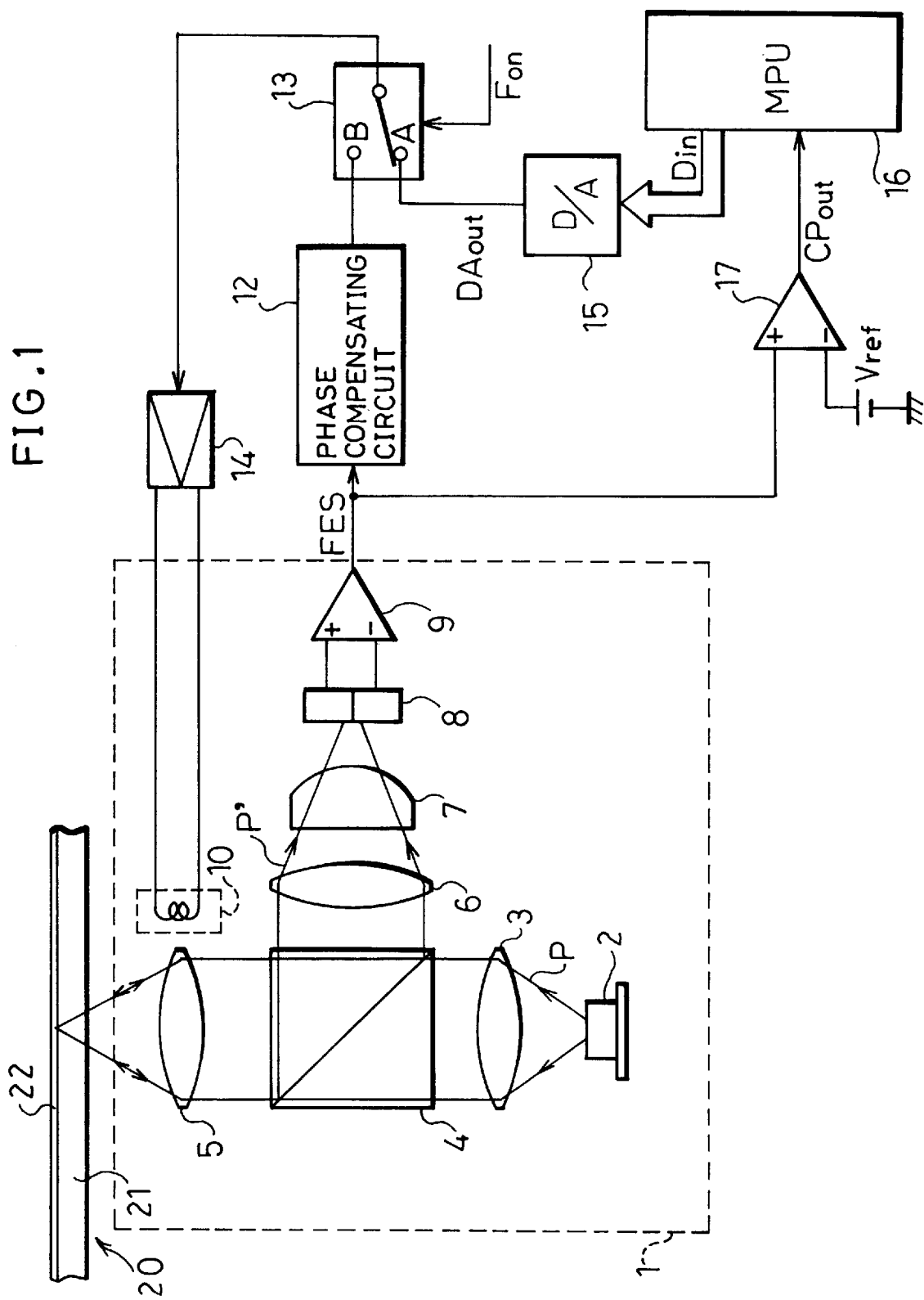
FIG. 1 is a view depicting a structure of an optical disk device in accordance with Embodiment 1 of the present invention.

As shown in FIG. 1, an optical disk device of the present invention includes an optical pickup 1 for recording/reproducing information in/from an optical disk 20 by irradiating a laser beam P to the same.

The optical pickup 1 includes a semi-conductor laser 2 for emitting the laser beam P, a collimator lens 3 for converting the laser beam P from the semi-conductor laser 2 into parallel beams, a beam splitter 4 capable of transmitting the parallel beams, and an objective lens 5 serving as light converging means for converging the parallel beams into a laser spot on the optical disk 20.

The optical pickup 1 includes a servo signal detecting optical system for carrying out a focus servo, which comprises the beam splitter 4 for reflecting a reflected beam P' from the optical disk 20 toward a two-piece photo-diode 8 which will be described below, a converging lens 6 for converging the reflected light P', a cylindrical lens 7 for producing aberration in the reflected light P', the two-piece photo-diode (servo signal detecting photo-detector) 8, and a differential amplifier 9 for generating a focus error signal FES by subtracting either signal from the two-piece photo-diode 8 from the other. Note that the differential amplifier 9 is installed in the optical pickup 1 in the present embodiment; however, the same may be placed outside of the optical pickup 1.

The present optical disk device further includes a phase compensating circuit 12 for compensating the phase of the focus error signal FES and a power amplifier 14. A focus actuator 10 serving as a driver is connected to the power amplifier 14 to control the objective lens 5 to bring the focal point Z of the laser beam P emitted through the objective lens 5 onto a recording layer 22 of the optical disk 20. In short, the focus servo is carried out by feeding back the focus error signal FES to the focus actuator 10 through the phase compensating circuit 12 and power amplifier 14.

Before the focus servo is started, the focus search is carried out by moving the objective lens 5 to bring the focal point Z of the laser beam P onto the recording layer 22. This is because the dynamic range of the focus error signal FES is as small as tens of microns, and therefore, the objective lens 5 should be forcibly moved so that the recording layer 22 is positioned within the depth of focus of the objective lens 5. In the present embodiment, the thickness of a substrate 21 of the optical disk 20 is checked using this focus search.

Therefore, to carry out the focus search, the optical disk device further includes a switch circuit 13 serving as a switch, a D/A (Digital/Analog) converter 15, an MPU (Microprocessor) 16 serving as a controller, and a comparator 17 in addition to the power amplifier 14 and focus actuator 10.

The switch circuit 13 is a changeover circuit for connecting the power amplifier 14 to either the phase compensating circuit 12 or D/A converter 15. To be more specific, the terminal B of the switch circuit 13 is connected to the phase compensating circuit 12, while the terminal A of the same is connected to the D/A converter 15. The switch circuit 13 is connected to the terminal A side during the focus search, and the focus servo is started when the connecting point of the switch circuit 13 is switched to the terminal B from the terminal A in response to a control signal $F_{on}$ from an unillustrated focus pull-in control circuit.

The D/A converter 15 outputs an analog output signal $DA_{out}$ based on a digital input signal $D_{in}$ serving as a moving signal from the MPU 16.

The MPU 16 sets a value of the output signal $DA_{out}$. More specifically, the minimum output value $DA_{min}$ of the output signal $DA_{out}$ is set to a value such that locates the focal point Z of the laser beam P emitted through the objective lens 5 below the optical disk 20. On the other hand, the maximum output value $DA_{max}$ of the output signal $DA_{out}$ is set to a value such that prevents the objective lens 5 and optical disk 20 from touching each other.

The MPU 16 also measures a time interval between the variances in the wave forms of a digital signal $CP_{out}$ output from the comparator 17 when the focal point Z of the laser beam P emitted through the objective lens 5 passes through the surface of the substrate 21 (hereinafter, referred to as the substrate surface 21s) of the optical disk 20 and the recording layer 22, respectively.

The positive terminal of the comparator 17 receives the focus error signal FES outputted from the differential amplifier 9, while the negative terminal of the same is impressed by a threshold voltage $V_{ref}$ used herein as a reference voltage. Then, the comparator 17 compares the threshold voltage $V_{ref}$ with the focus error signal FES during the focus search, and detects variance in the wave forms of the focus error signal FES as the digital signal $CP_{out}$ to output the detection result to the MPU 16. The digital signal $CP_{out}$ shifts to the high level (hereinafter, referred to as H level) when the focus error signal FES is greater than the threshold voltage $V_{ref}$ and shifts to the low level (hereinafter, referred to as L level) otherwise.

Note that in the claims a, moving section is composed of the focus actuator 10, switch circuit 13, power amplifier 14, D/A convertor 15, and MPU 16 serving as a moving signal generator; a detector is composed of the two-piece photo-diode 8 and differential amplifier 9; and a judging sector corresponds to the MPU 16.

According to the above arrangement, the MPU 16 changes the output signal $DA_{out}$ from the D/A converter 15 gradually, and moves the objective lens 5 by means of the switch circuit 13, power amplifier 14, and focus actuator 10 to carry out the focus search.

Figure 2:
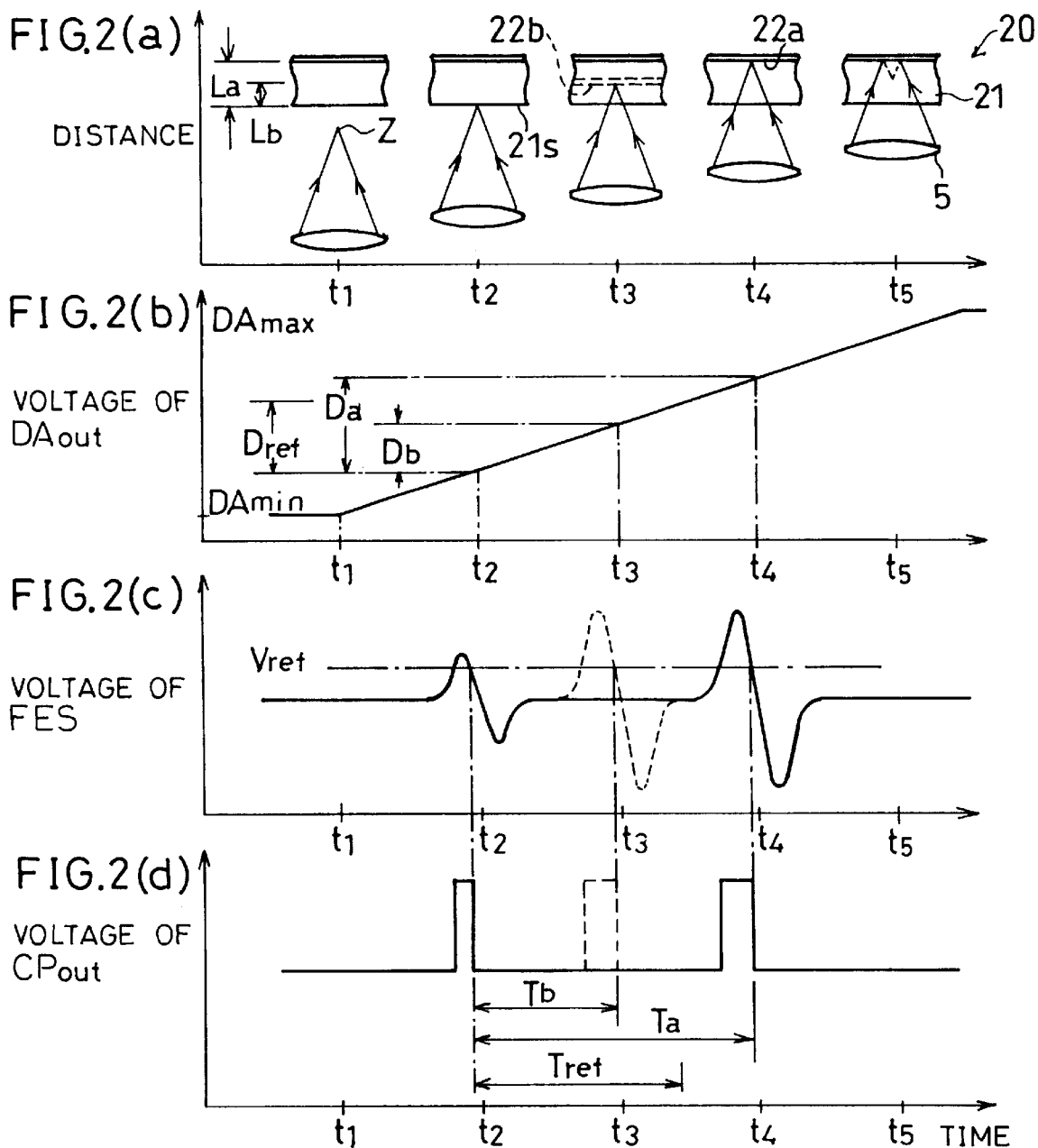
FIG. 2(a) is a view explaining focusing positions of a laser beam.
FIG. 2(b) is a view illustrating a wave form of an output signal from a D/A converter with reference to FIG. 2(a)
FIG. 2(c) is a view illustrating a wave form of a focus error signal with reference to FIG. 2(a)
FIG. 2(d) is a view illustrating a wave form of an output signal from a comparator with reference to FIG. 2(a)

The focus search is illustrated in FIGS. 2(a) through 2(d) where time is taken on the axis of abscissa. FIG. 2(a) illustrates the positions of the objective lens 5 and optical disk 20 with respect to each other, and FIG. 2(b) illustrates a wave form of the output signal $DA_{out}$ from the D/A converter 15. FIG. 2(c) illustrates a wave form of the focus error signal FES, and FIG. 2(d) illustrates a wave form of the digital signal $CP_{out}$ output from the comparator 17. In these drawings, the recording layer 22 is referred to as the recording layers 22a and 22b when the substrate 21 is 1.2 mm thick and 0.6 mm thick, respectively.

To begin with, a case when the substrate 21 has a thickness, $L_a$=1.2 mm, will be described.

Assume that the focus search starts at a time $t_1$, then the minimum output value $DA_{min}$ is output as the output signal $DA_{out}$ from the D/A converter 15. The wave form of the focus error signal FES does not vary at this point because it is outside of the dynamic range.

The output signal $DA_{out}$ is increased gradually by the MPU 16, and the focal point Z of the laser beam P reaches the substrate surface 21s at a time $t_2$. An S-shaped wave form such that has a 0 volt at the focusing position appears in the focus error signal FES based on the reflected light from the substrate surface 21s. When the focus error signal FES exceeds the threshold voltage $V_{ref}$, a pulse of the digital signal $CP_{out}$ from the comparator 17 is detected.

At a time $t_3$, the wave form of the focus error signal FES does not vary, because the focal point Z is inside the substrate 21.

At a time $t_4$, the focal point Z reaches the recording layer a. An S-shaped wave form such that has a 0 volt at the focusing position appears in the focus error signal FES based on the reflected light from the recording layer 22a. Since a larger quantity of light is reflected from the recording layer 22a than the substrate surface 21s, the peak voltage of the variance in the wave forms of the focus error signal FES at the time $t_4$ is higher than the peak voltage of the focus error signal FES at the time $t_2$. Like at the time $t_2$, when the focus error signal FES exceeds the threshold voltage $V_{ref}$, a pulse of the digital signal $CP_{out}$ output from the comparator 17 is detected.

At a time $t_5$, the laser beam P is reflected from an unillustrated reflecting film which is placed to oppose the substrate 21 with the recording layer 22a in between. Since the focal point Z of the reflected light is inside the substrate 21 at this point, the wave form of the focus error signal FES does not vary.

Subsequently, the output signal $DA_{out}$ is increased to the maximum output value $DA_{max}$ to end the focus search.

Next, a case when the substrate 21 has a thickness, $L_b$=0.6 mm, will be described.

At the time $t_1$, the wave form of the focus error signal FES does not vary for the same reason explained in the above case ($L_a$=1.2 mm). Also, at the time $t_2$, an S-shaped wave form appears in the focus error signal FES based on the reflected light from the substrate surface 21s in the same manner as above ($L_a$=1.2 mm). At the time $t_3$, since the substrate 21 has the thickness of $L_b$=0.6 mm, the recording layer 22b is placed at the focusing position as is indicated by broken lines in FIG. 2(a). Thus, as is indicated by a broken line in FIG. 2(c), an S-shaped wave form appears in the focus error signal FES at this point. When the focus error signal FES exceeds the threshold voltage $V_{ref}$, a pulse of the digital signal $CP_{out}$ output from the comparator 17 is detected as is indicated by a broken line in FIG. 2(d). At times $t_4$ and $t_5$, the wave form of the focus error signal FES does not vary because the focal point Z of the laser beam P is inside the substrate 21.

As has been explained, the S-shaped wave forms appear in the focus error signal FES at different intervals depending on the thickness of the substrate 21. Thus, the thickness of the substrate 21 can be judged during the focus search by measuring a time interval between the first pulse and second pulse output from the comparator 17 when the focal point Z of the laser beam P emitted through the objective lens 5 passes through the substrate surface 21s and the recording layer 22, respectively, by means of the MPU 16.

Note that the focus search is carried out separately for judging the thickness of the substrate 21 and for starting the focus servo. In the first place, the focus search is carried out until the focal point Z of the laser beam P passes through the recording layer 22, so that the thickness of the substrate 21 is judged in the above manner. Then, the aberration is corrected based on the thickness thus judged, after which an operation to start the focus servo is carried out. In other words, the focus servo is started by switching the connecting point of the switch circuit 13 to the terminal B from the terminal A in response to the control signal $F_{on}$ from the focus pull-in control circuit when the focal point Z of the laser beam P reaches the recording layer 22.

Figure 3:
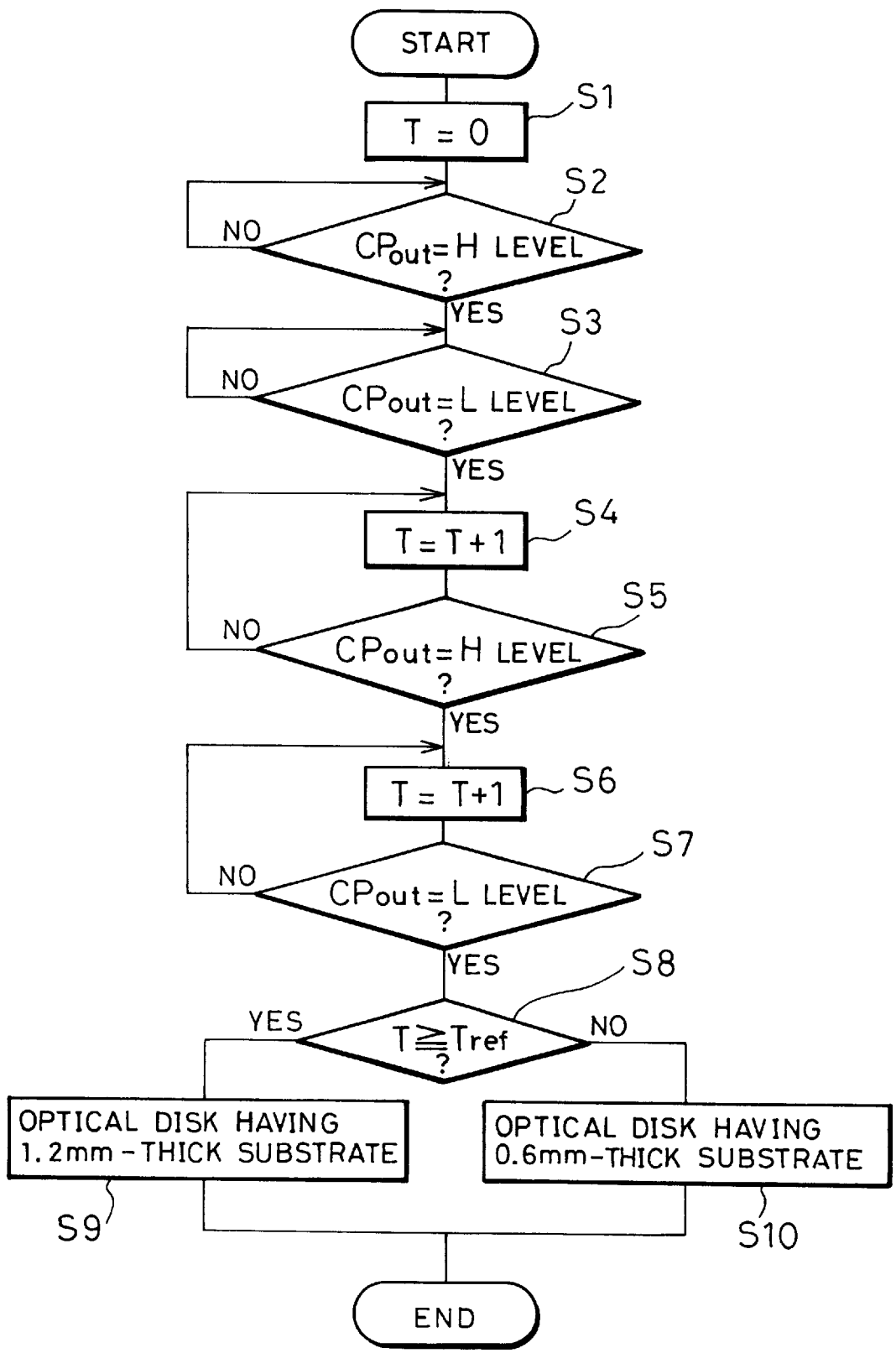
FIG. 3 is a flowchart detailing a time measuring operation by an MPU in the above optical disk device.

Next, the time measuring operation by the MPU 16 will be explained with reference to the flowchart of FIG. 3.

Once the focus search is started, a time measuring variable T in the MPU 16 is set to zero (S1), and in the mean time, the output signal $DA_{out}$ from the D/A converter 15 increases gradually from the minimum output value $DA_{min}$. Note that the D/A converter 15 is arranged in such a manner that a variable D of the input data of the same, which determines the input signal $D_{in}$, increases one by one over time (as the objective lens 5 moves).

Next, whether the digital signal $CP_{out}$ output from the comparator 17 is in the H level or not is judged (S2). Once the L-to-H level shifting of the digital $CP_{out}$ is judged in S2, whether the H-to-L level shifting of the digital signal $CP_{out}$ is judged (S3). When the H-to-L level shifting is judged, the MPU 16 proceeds to S4. In short, in S2 and S3, the falling edge of the first pulse is detected by detecting the H-to-L level shifting of the digital signal $CP_{out}$ following the L-to-H level shifting of the same.

Subsequently, the variable T is increased one by one until the digital signal $CP_{out}$ shifts to the H level again (S4). Once the digital signal $CP_{out}$ has shifted to the H level (S5), the variable T is increased further one by one until the digital signal $CP_{out}$ shifts to the L level again (S6 and S7). In short, in S4 through S7, a time interval between the falling edge of the first pulse and the falling edge of the second pulse is measured by increasing the variable T until the second pulse is detected. For example, when $L_a$=1.2 mm, the value of the variable T is $T_a$, and when $L_b$=0.6 mm, the value of the variable T is $T_b$ (See FIG. 2(d)).

Next, the value of the latest variable T is compared with a predetermined reference value $T_{ref}$, or a reference time (S8). When the former is greater than the latter in S8, the substrate 21 is judged to have a thickness of 1.2 mm (S9). On the other hand, when the former is smaller than the latter, the substrate 21 is judged to have a thickness of 0.6 mm (S11). The reference value $T_{ref}$ used herein is a median value of a standard variable $T_a$ for the 1.2 mm-thick substrate 21 and a standard variable $T_b$ for the 0.6 mm-thick substrate 21.

As has been explained, since the optical disk device of the present embodiment uses output signals from the servo signal detecting two-piece photo-diode 8, the same can judge the thickness of the substrate 21 without including any additional components, such as a sensor. Moreover, it is not necessary to append information identifying the thickness of the substrate 21 to the optical disk 20 or its cartridge. Further, the optical disk device of the present embodiment can judge the thickness of the substrate 21 before it reproduces the recorded information from the optical disk 20.

In the above method, if the surface of the optical disk 20 vibrates while it is rotating, the thickness may not be detected correctly. However, this problem can be eliminated by detecting the thickness before the optical disk is rotated or using an inner side of the optical disk 20 where the vibration is slight.

In the present embodiment, the time is measured by a software program using the MPU 16. However, the same can be done by using hardware, such as a pulse counting circuit.

(EMBODIMENT 2)

Figure 4:
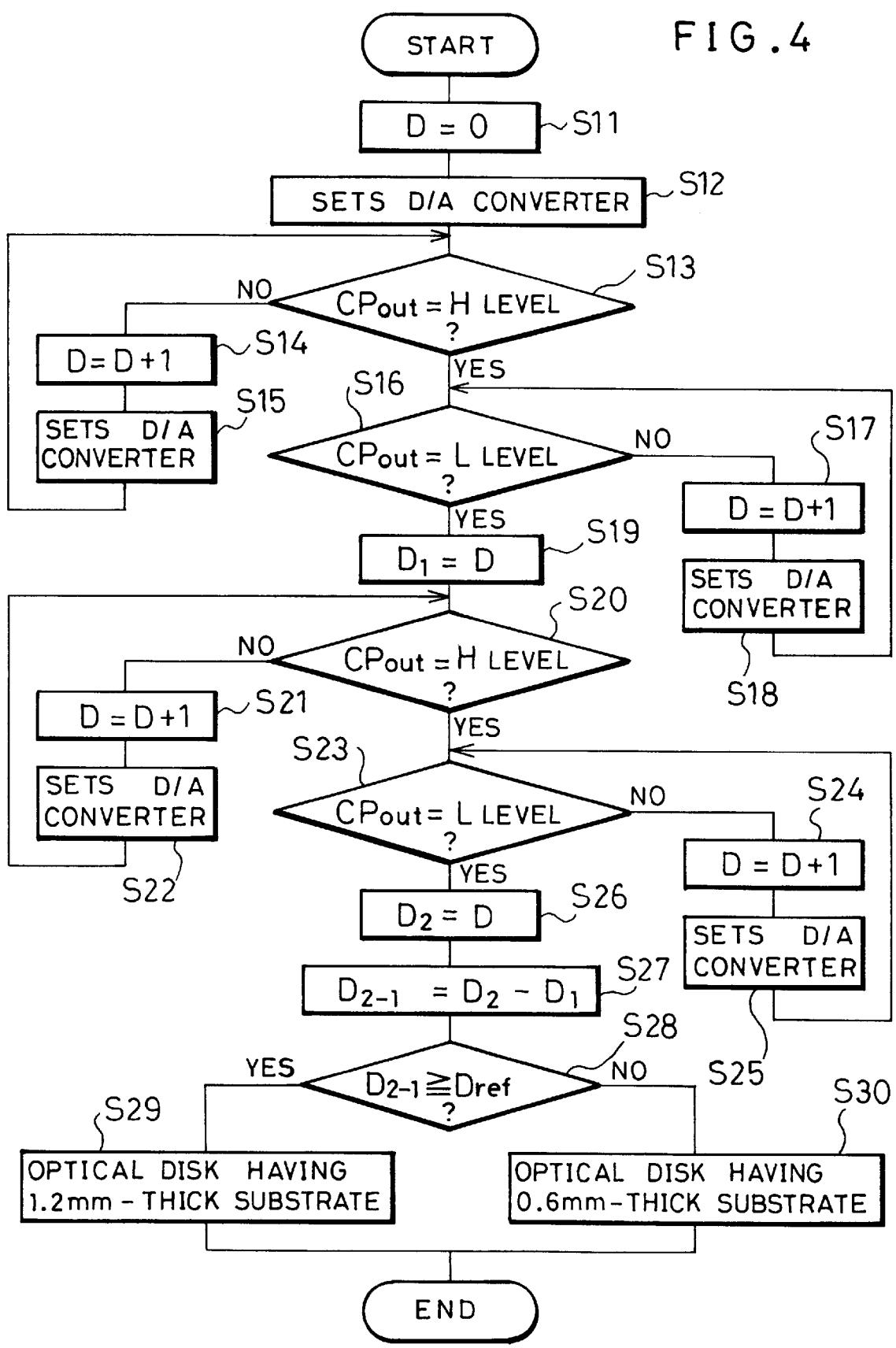
FIG. 4 is a flowchart detailing a level detecting operation by an MPU in an optical disk device in accordance with Embodiment 2 of the present invention.

Referring to FIGS. 2(b) and 4, the following description will describe Embodiment 2 of the present invention. Hereinafter, like components are labeled with like reference numerals with respect to Embodiment 1, and the description of these components is not repeated for the explanation's convenience.

An optical disk device of the present embodiment is identical with its counterpart in Embodiment 1 except that the MPU 16 detects a level of an objective lens driving signal based on the digital signal $CP_{out}$ output from the comparator 17 instead of measuring the time interval of the variance in the wave forms of the digital signal $CP_{out}$ per se.

The input signal $D_{in}$ of the D/A converter 15 is used as the objective lens driving signal. Since the input signal $D_{in}$ is an output signal from the MPU 16, the value of the same can be detected without using any signal detecting hardware.

The level detecting operation by the MPU 16 will be explained with reference to the flowchart of FIG. 4.

To begin with, the variable D of the input data of the D/A converter 15, which determines the input signal $D_{in}$, is set to the lower limit, 0 (S11). Then, the MPU 16 sets the above value 0 of the variable D in the D/A converter 15 (S12).

Subsequently, whether the digital signal $CP_{out}$ outputted from the comparator 17 is in the H level or not is judged (S13). When the digital signal $CP_{out}$ is in the L level, the value of the variable D is increased by one (S14), and the updated variable D is set in the D/A converter 15 (S15). On the other hand, when the digital signal $CP_{out}$ is judged to be in the H level, whether the digital signal $CP_{out}$ has shifted to the L level or not is judged (S16). When the digital signal $CP_{out}$ stays in the H level in S16, the value of the variable D is increased by one again (S17), and the updated variable D is set in the D/A converter 15 (S18). In short, in S13 through S18, the value of the variable D (the set value in the D/A converter 15) is increased one by one until the first pulse is detected, so that the objective lens 5 is approximated to the optical disk 20. The falling edge of the first pulse is detected by detecting the H-to-L level shifting of the digital signal $CP_{out}$ following the L-to-H level shifting of the same.

The value of the variable D when the first pulse is detected is stored as a variable $D_1$ (S19). Subsequently, the value of the variable D (the set value in the D/A converter 15) is increased one by one until the second pulse is detected in the same manner as S13 through S18 (S20 through S25), so that the objective lens 5 is approximated to the optical disk 20. The falling edge of the second pulse is detected by detecting the H-to-L level shifting of the digital signal $CP_{out}$ following the L-to-H level shifting of the same.

The value of the variable D when the second pulse is detected is stored as a variable $D_2$ (S26). Subsequently, the balance between the variables $D_1$ and $D_2$ is stored as a variable $D_{2-1}$ (S27). In other words, the value of the variable $D_{2-1}$ represents the difference between the levels of the objective lens driving signal when the falling edge of the first pulse is detected and when the falling edge of the second pulse is detected. For example, when $L_a$=1.2 mm, the variable $D_{2-1}$ is $D_a$, and when $L_b$=0.6 mmm, the variable $D_{2-1}$ is $D_b$ (See FIG. 2(b)).

When the variable $D_{2-1}$ is greater than a predetermined reference value $D_{ref}$, the optical disk 20 is judged to have the substrate 21 of 1.2 mm-thick (S29); otherwise, the optical disk 20 is judged to have the substrate 21 of 0.6 mm-thick (S30). The reference value $D_{ref}$ referred herein is a median value of a standard variable $D_a$ of the optical disk 20 having the 1.2 mm-thick substrate 21 and a standard variable $D_b$ of the optical disk 20 having the 0.6 mm-thick substrate 21.

As has been explained, the optical disk device of the present embodiment can judge the thickness of the substrate 21 by detecting the level difference of the objective lens driving signal when the first pulse and second pulse are output from the comparator 17 at the moment the focal point Z of the laser beam P emitted through the objective lens 5 passes through the substrate surface 21s and the recording layer 22, respectively.

The level detection is carried out by a software program using the MPU 16 in the present invention; however, the same can be done by using a low frequency oscillation circuit for the focus search.

Alternatively, an output from the above low frequency oscillation circuit or an output current from the power amplifier 14 may be detected instead of the level of the objective lens driving signal. However, using a software program like in the present embodiment is advantageous in that the optical disk device can comprise a fewer components.

The focus error signal FES, which is in effect a difference signal of the output signals from the two-piece photo-diode 8, is used in the Embodiments 1 and 2; however, a sum signal of the outputs signals from the two-piece photo-diode 8 may be used instead. In this case, it is not the S-shaped wave form that appears in the total signal when the focal point Z reaches the substrate surface 21s and recording layer 22, but a signal wave form proportional to a quantity of the reflected light.

Alternatively, an output signal from a tracking error signal detecting photo-diode or an output from a information reproducing photo-diode may be used instead of the output signal from the servo signal detecting two-piece photo-diode 8.

(EMBODIMENT 3)

Figure 5:
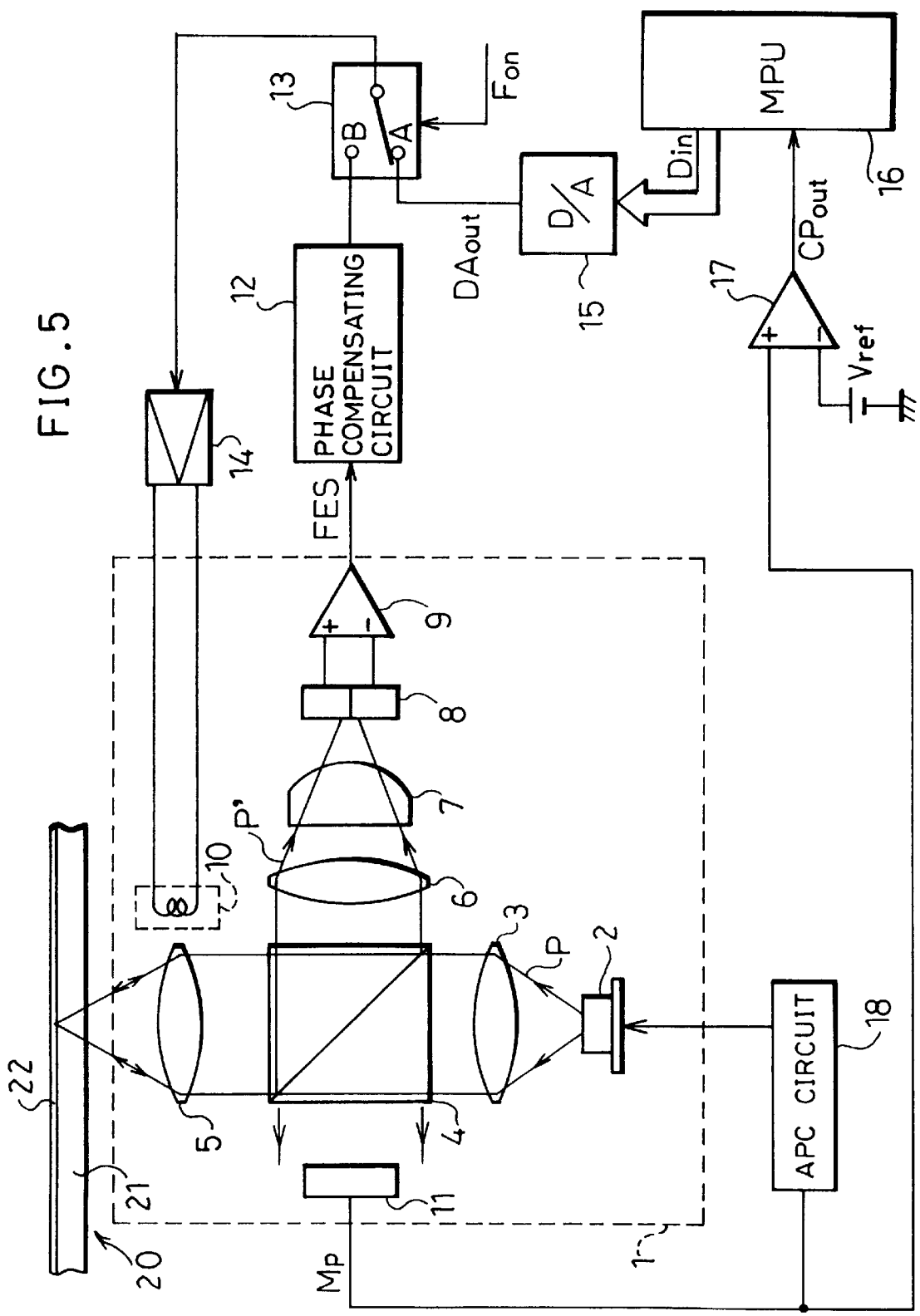
FIG. 5 is a view depicting a structure of an optical disk device in accordance with Embodiment 3 of the present invention.
Figure 6:
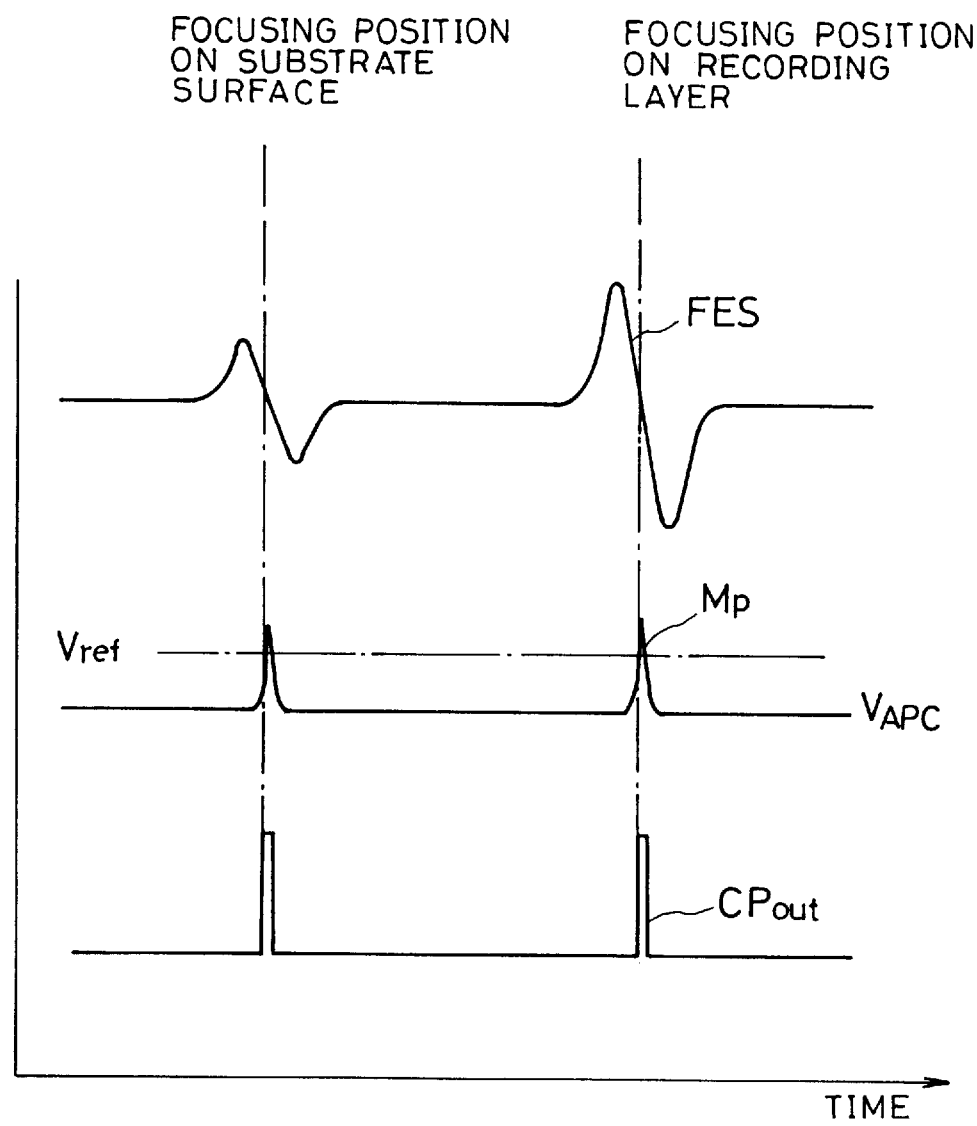
FIG. 6 is a view illustrating wave forms of a focus error signal, a laser power detecting signal, and an output signal from a comparator in the above optical disk device, respectively.

Referring to FIGS. 5 and 6, the following description will describe Embodiment 3 of the present invention. Hereinafter, like components are labeled with like reference numerals with respect to Embodiments 1 and 2, and the description of these components is not repeated for the explanation's convenience.

An optical disk device of the present embodiment detects the thickness of the substrate of an optical disk using an output signal from a photo-detector for detecting a semiconductor laser power. As shown in FIG. 5, compared with its counterpart in Embodiment 1, the optical disk device of the present embodiment additionally includes a photo-detector 11 for detecting a quantity of light emitted from the semi-conductor laser 2 and an APC (Automatic Power Control) circuit 18.

The photo detector 11 detects a laser beam P emitted from the semi-conductor laser 2 as a laser power detecting signal $M_p$. The APC circuit 18 carries out a so-called APC operation, that is, an operation based on the laser power detecting signal $M_p$ to control the semiconductor laser 2, whose input/output characteristics readily varies depending on temperature, to emit a constant quantity of light. The laser power detecting signal $M_p$ is also input into the positive terminal of the comparator 17.

According to the above arrangement, the APC operation is carried out in the following manner. To begin with, the laser beam P emitted from the semiconductor laser 2 is reflected by the beam splitter 4 partially, and monitored by the photo-detector 11. Then, the laser power detecting signal $M_p$ is fed back to the semi-conductor laser 2 from the photo-detector 11 through the APC circuit 18.

On the other hand, as shown in FIG. 6, the laser power detecting signal $M_p$ surges abruptly when the focal point Z of the laser beam P emitted through the objective lens 5 respectively passes through the substrate surface 21s and recording layer 22 during the focus search.

This phenomenon, that is, the laser power detecting signal $M_p$ surges abruptly around the focusing position, is understood as a bond resonance phenomenon (scoop effect), in which a part of reflected light from the optical disk 20 is fed back to the semi-conductor laser 2, meaning that the optical disk 20 serves as an external mirror of a semi-conductor laser oscillator, the explanation of which is set forth in "Introduction for Video Disk and DAD", Corona Co. Ltd. In the drawing, the level $V_{APC}$ is the level at which a quantity of emitted light from the semi-conductor laser 2 is maintained at a certain level by the APC operation.

The laser power detecting signal $M_p$ is input into the comparator 17, and compared with a predetermined threshold voltage $V_{ref}$, or the reference voltage. On the other hand, the digital signal $CP_{out}$, which shifts to the H level when the laser power detecting signal $M_p$ is greater than the threshold voltage $V_{ref}$ and to the L level otherwise, is outputted to the MPU 16.

The MPU 16 measures a time interval between the first pulse and second pulse output from the comparator 17 when the focal point Z of the laser beam P emitted through the objective lens 5 passes through the substrate surface 21s and the recording layer 22, respectively during the focus search in the same manner as Embodiment 1. Accordingly, the thickness of the substrate 21 can be detected in the same manner as Embodiment 1.

A quantity of the emitted light from the semiconductor laser 2 increases around the focusing position even when the same is controlled to stay at a certain level by the APC operation. This is because the APC operation aims at compensating the temperature dependency of the semi-conductor laser 2, and the response rate in the APC operation is set to a low level. Thus, it is natural that the APC operation can not prevent an increase of the semi-conductor power when the focal point Z passes through the focusing position during the focus search. If an increase in the semi-conductor laser power during the focus search is prevented by accelerating the APC operation, the semi-conductor laser control signal in the APC circuit 18 varies. Thus, this semi-conductor laser control signal can be used to detect the thickness of the substrate 21.

In Embodiments 1 through 3, the optical disk 20 includes the substrate 21 of either 1.2 mm or 0.6 mm thick. However, the optical disk device of Embodiments 1 through 3 can identify an optical disk having the substrate of other thickness as well.

As has been explained, each of the optical disk devices of Embodiments 1 through 3 includes the optical pickup for converging a laser beam emitted from the semiconductor laser through the objective lens, and the record information is reproduced from the recording layer of the optical disk using the optical pickup.

The focal point of the laser beam emitted through the objective lens is moved in a region covering both the recording layer and the substrate surface of the optical disk in a direction along the thickness of the optical disk by moving the objective lens. Then, an interval between the variance in the wave forms of the signal output from the optical pickup, which appear when the focal point of the laser beam passes through the substrate surface and recording layer, respectively, is detected.

In other words, the focal point of the laser beam is moved in a direction along the thickness of the optical disk, so that the focal point passes through the substrate surface and recording layer, respectively. The wave form of the signal output from the optical pickup varies when the focal point passes through the substrate surface and recording layer, respectively. Since the interval between the above variance varies depending on the thickness of the substrate of the optical disk, detecting the above interval makes it possible to judge the thickness of the substrate.

Therefore, unlike the conventional optical disk device, the above optical disk devices can judge the thickness of the substrate while it omits the read mechanism other than the optical pickup, such as reflective type sensor, and appended information to the optical disk or cartridge. Further, the above optical disk devices can judge the thickness of the substrate before the record information is reproduced from the optical disk.

The interval between the variance in the wave forms can be detected by two methods. In the first method, the signal outputted from the optical pickup is compared with a predetermined threshold to be converted into a digital signal, and the time interval between the pulses, which correspond to the variance in the wave forms of the original signal, is measured.

As previously explained, the wave form of the signal output from the optical pickup varies when the focal point of the laser beam passes through the substrate surface and recording layer, respectively. The original signal with such varying wave forms is compared with the predetermined threshold, and converted into the digital signal. If the time interval between the pulses of the digital signal is measured, the thickness of the substrate is expressed as a time function, thereby making it easy to judge the thickness of the substrate. Thus, once the data as to the correlation between the thickness of the substrate an d the time interval are provided, a single optical disk device can readily reproduce information from optical disks having the substrates of different thicknesses.

In the other detecting method, the signal output from the optical pickup is compared with a predetermined threshold and converted into the digital signal, based on which the level of an objective lens driving signal is detected.

As previously explained, the wave form of the signal output from the optical pickup varies when the focal point of the laser beam passes through the substrate surface and recording layer, respectively. The original signal with such varying wave forms is compared with the predetermined threshold, and converted into the digital signal. If the level of the objective lens driving signal is detected based on the pulses of the above digital signal, the thickness of the substrate is expressed as the signal level function, thereby making it easy to judge the thickness of the substrate. Thus, once the data as to the correlation between the thickness of the substrate and the signal level are provided, a single optical disk device can readily reproduce information from optical disks having the substrates of different thicknesses.

The signal output from the optical pickup may be generated by the servo signal detecting photo-detector which is used to control the optical pickup based on a quantity of the reflected light from the optical disk, or the photo-detector for detecting a quantity of a laser beam emitted from the semiconductor laser which is used to control the semiconductor laser to output a constant quantity of light.

In case of the former, the level of the signal from the servo signal detecting photo-detector rises due to the reflected light from the optical disk when the focal point of the laser beam reaches the substrate surface and recording layer, respectively. Since the wave form of the signal varies in the above manner, the optical disk devices of Embodiments 1 through 3 can be assembled easily. In case of the latter, the level of the output signal from the photo-detector for detecting a quantity of a laser beam emitted from the semiconductor laser rises due to the light returned to the semiconductor laser. Since the wave form of the signal varies in the above manner, the optical disk devices of Embodiments 1 through 3 can also be assembled easily.

(EMBODIMENT 4)

Figure 7A:
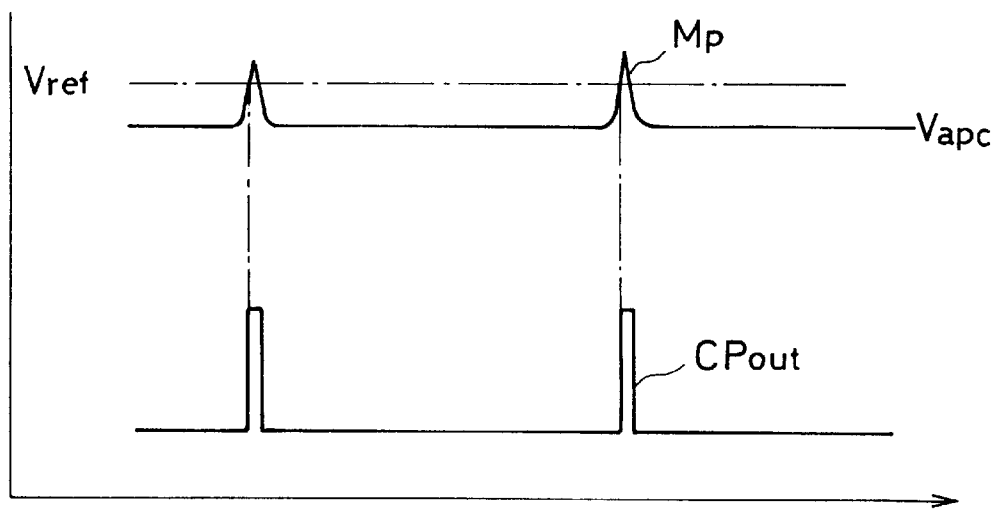
FIG. 7(a) is a view illustrating wave forms of a laser power detecting signal and an output signal from a comparator when an optical disk having a single-recording-layer is inserted into an optical disk device in accordance with Embodiment 4 of the present invention.
Figure 7B:
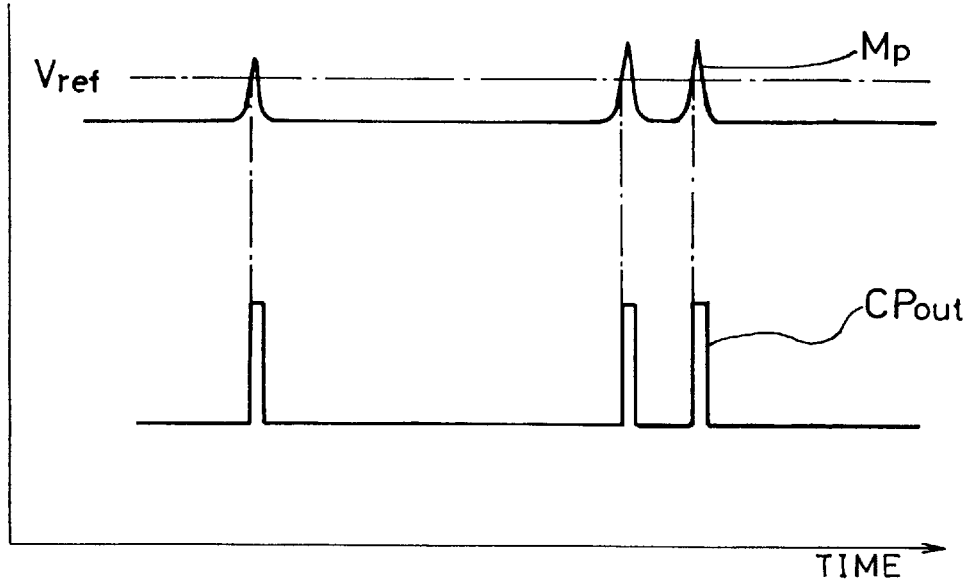
FIG. 7(b) is a view illustrating wave forms of the laser power detecting signal and an output signal from the comparator when an optical disk having a double-recording-layer is inserted into the above optical disk device.
Figure 8:
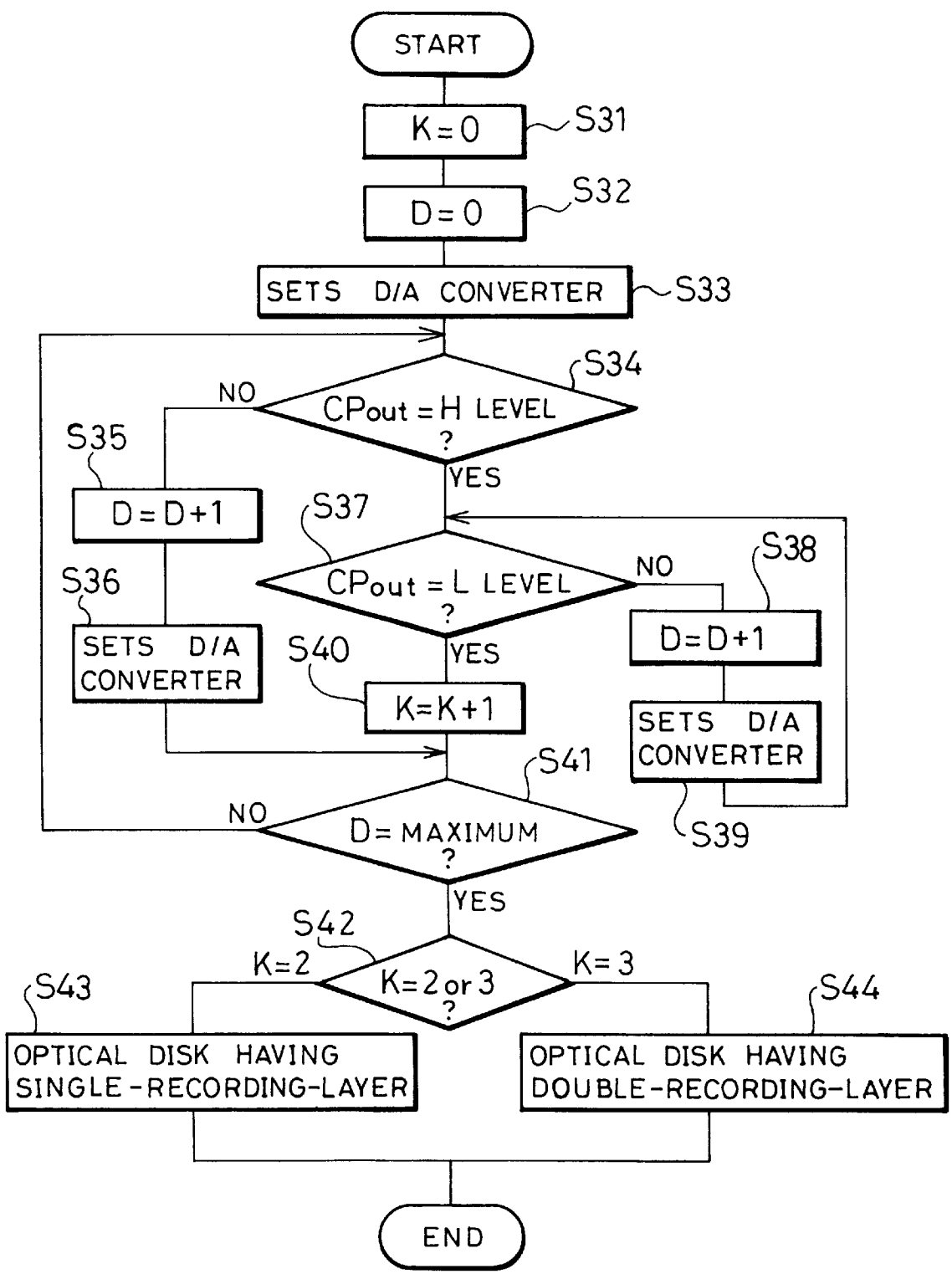
FIG. 8 is a flowchart detailing an operation for detecting the number of the recording layers by an MPU in the above optical disk device.

Referring to FIGS. 7(a) and 7(b) and FIG. 8, the following description will describe Embodiment 4 of the present invention. Hereinafter, like components are labeled with like reference numerals with respect to Embodiments 1 through 3, and the description of these components is not repeated for the explanation's convenience.

An optical disk device of the present embodiment judges whether an optical disk has a single- or double-cording-layer 22 using the laser power detecting signal $M_p$ that surges abruptly around the focusing position as was explained in Embodiment 3. An optical disk having the double-layer-recording layer 22 referred herein is an optical disk having a first recording layer and a second recording layer placed atop of the substrate 21 with a predetermined space.

The optical disk device of the present embodiment is identical with its counterpart in Embodiment 3 except that the MPU 16 counts the number of the pulses output from the comparator 17 when the focal point Z of the laser beam P emitted through the objective lens 5 passing through the substrate surface 21s, the first recording layer, and the second recording layer, respectively.

FIG. 7(a) illustrates signal wave forms of the laser power detecting signal $M_p$ and digital signal $CP_{out}$, respectively, when the optical disk 20 has the single-layer-recording layer 22, which was explained in Embodiment 3. FIG. 7(b) illustrates signal wave forms of the laser power detecting signal $M_p$ and digital signal $CP_{out}$, respectively, when the optical disk 20 has the double-layer-recording layer 22. In this case, the laser power detecting signal $M_p$ surges when the focal point Z of the laser beam P passes through the first and second recording layers, respectively, during the focus search. Thus, the number of layers in the recording layer 22 can be detected by counting the number of the pulses appearing in the digital signal $CP_{out}$ output from the comparator 17 using the MPU 16.

Next, the pulse number counting operation by the MPU 16 will be explained with reference to the flowchart of FIG. 8.

To begin with, a variable K for counting the number of layers in the recording layer 22 in the MPU 16 is set to zero (S31). Then, the variable D of the input data of the D/A converter 15 is set to the lower limit, 0 (S32), and the updated variable D is set in the D/A converter 15 by the MPU 16 (S33).

Subsequently, whether the digital signal $CP_{out}$ output from the comparator 17 is in the H level or not is judged (S34). When the digital signal $CP_{out}$ is judged to be in the H level, whether the digital signal $CP_{out}$ has shifted to the L level or not is judged (S37). When the digital signal $CP_{out}$ stays in the H level in S37, the value of the variable D is increased by one (S38), and the updated value is set in the D/A converter 15 again (S39). In short, in S37 through S39, when the first pulse is detected by detecting the L-to-H level shifting of the digital signal $CP_{out}$, the value of the variable D (set value in the D/A converter 15) is increased by one, so that the objective lens 5 is approximated to the optical disk 20. The falling edge of the first pulse is detected by detecting the H-to-L level shifting of the digital signal $CP_{out}$.

Then after detecting the first pulse in the above manner, a value 1 is added to the variable K for counting the number of layers in the recording layer 22 (S40). Subsequently, whether the latest variable D has the maximum value or not is checked, in other words, whether the focus search has ended or not is confirmed (S41).

On the other hand, when the digital signal $CP_{out}$ is not judged to be in the H level in S34, the value of the variable D is increased by one (S35), and the updated value is set in the D/A converter 15 again (S36), after which the MPU 16 skips to S41.

S34 through S39 are repeated until the variable D has the maximum value while the number of the pulses of the digital signal $CP_{out}$ are counted. When the variable D reaches the maximum value in S41, whether the variable K has a value 2 or 3 is checked (S42).

When the variable K has a value 2, the recording layer 22 is judged to be the single-recording-layer 22 by subtracting the pulse produced when the optical point Z reaches the substrate surface 21s (S43). Whereas when the variable K has a value 3, the recording layer 22 is judged to be the double-recording-layer 22 by subtracting the pulse produced when the optical point Z reaches the substrate surface 21s (S44).

As has been explained, the optical disk device of the present embodiment carries out the focus search in a region where the focal point Z would move in case of the double-recording-layer 22, so that the number of the layers in the recording layer 22 can be detected by counting the number of the variance in the wave forms of the laser power detecting signal $M_p$ by the MPU 16. Also, even when the space between the first and second recording layers is tens of microns at most, the variance in the wave forms of the laser power detecting signal $M_p$ caused by each recording layer does not interfere with each other, thereby making it possible to detect the number of the layers in the recording layer 22 in a reliable manner.

Consequently, the optical disk device of the present embodiment can reproduce information from optical disks having different number of recording layers by applying the focus servo on a target recording layer or switching the circuit gain depending on the number of the recording layers.

In the present embodiment, whether the optical disk has the single-recording-layer 22 or double-recording-layer 22 is judged. However, the optical disk device of the present embodiment can judge if the optical disk has the recording-layer 22 composed of more than two layers.

Additionally, the technique of the present embodiment can be used for checking whether an optical disk is inserted into the optical disk device or not. That is to say, when the variable K has a value 0 as a result of the above operation, the optical disk device judges that an optical disk is not inserted.

As has been explained, the optical disk of the present embodiment includes the optical pickup for converging a laser beam emitted from the semiconductor laser through the objective lens, and the record information is reproduced from the recording layer of the optical disk using the optical pickup.

The focal point of the laser beam emitted through the objective lens is moved in the region covering all the recording layers of the optical disk in a direction along the thickness of the optical disk by moving the objective lens. The number of the variance in the wave forms of the signal generated by the photo-detector for detecting a quantity of a laser beam emitted from the semiconductor laser, which is used to control the semiconductor laser to output a constant quantity of light when the focal point of the laser beam passes through the substrate surface and recording layer(s), respectively, is counted.

In other words, the focal point of the laser beam is moved in a direction along the thickness of the optical disk, so that the focal point passes through the substrate surface and recording layer (s), respectively. The level of the signal output from the above photo-detector rises due to the light returned to the semiconductor laser when the focal point of the laser beam reaches the substrate surface and recording layer(s), respectively. Since the number of the rises in the level of the signal varies depending on the number of the recording layers, counting the number of rises in the signal level makes it possible to judge the number of the recording layers. Note that the level of the signal rises so abruptly that the variance in the wave forms of the signal does not interfere with each other even when the space between the recording layers is small.

Consequently, the optical disk device of the present embodiment can reproduce the information from the optical disk having more than one recording layer by carrying out the focus servo on a target recording layer or switching the circuit gain depending the number of the recording layers thus judged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk device comprising:

light converging means for converging a laser beam onto an optical disk having a substrate and a recording layer;

moving means for moving said light converging means in a direction along a thickness of said optical disk;

detecting means for detecting a focus error signal based on reflected light which is incident on said detecting means from said optical disk through said light converging means, and for detecting variance produced, as said light converging means is moved, in said focus error signal when said laser beam is converged on said substrate and said recording layer, respectively;

comparing means for comparing the variance in said focus error signal with a reference voltage to output a first comparing result in the form of a binary pulse signal; and judging means for measuring a time interval of said pulse signal to compare said time interval with a reference time and judge a thickness of said substrate based on a second comparing result.

2. The optical disk device of claim 1, wherein said moving means includes:

moving signal generating means for generating a moving signal, by which said light converging means is moved; and driving means for moving said light converging means in the direction along the thickness of said optical disk based on said moving signal.

3. The optical disk device of claim 2, wherein said moving signal varies substantially linearly over time, said moving signal moving said light converging means in a region covering both a surface of said substrate and said recording layer.

4. The optical disk device of claim 3 further comprising:

phase compensating means for compensating a phase of said focus error signal; and switching means for switching an input of said driving means, so that said input receives an output from said phase compensating means when a focus servo control is carried out, and said moving signal when the thickness of said substrate is judged.

5. The optical disk device of claim 4 further comprising D/A converting means, through which said moving signal is outputted under a control of said moving signal generating means.

6. The optical disk device of claim 2, wherein said moving signal generating means and said judging means are composed of a microprocessor.

7. The optical disk device of claim 1, wherein said reference time is a median value of a time interval measured when a 1.2 mm-thick substrate is used and a time interval measured when a 0.6 mm-thick substrate is used.

8. A method for measuring the thickness of an optical disk comprising the steps of:

(a) converging a laser beam with a light converging device onto an optical disk having a substrate and a recording layer;

(b) moving said light converging device in a direction along a thickness of said optical disk;

(c) detecting a focus error signal with a detecting device based on reflected light which is incident on said detecting device from said optical disk through said light converging device;

(d) detecting a variance produced as said light converging device is moved in said focus error signal when said laser beam is converged on said substrate and said recording layer, respectively;

(e) comparing the variance in said focus error signal with a reference voltage to output a first comparing result in the form of a binary pulse signal; and (f) measuring a time interval of said pulse signal to compare said time interval with a reference time and judge a thickness of said substrate based on a second comparing result.

9. The method of claim 8, wherein step (b) includes:

generating a moving signal, by which said light converging device is moved; and moving said light converging device in the direction along the thickness of said optical disk based on said moving signal.

* * * * *